United States Patent
Chacko et al.

(10) Patent No.: US 9,748,043 B2
(45) Date of Patent: Aug. 29, 2017

(54) METHOD OF IMPROVING ELECTROMECHANICAL INTEGRITY OF CATHODE COATING TO CATHODE TERMINATION INTERFACES IN SOLID ELECTROLYTIC CAPACITORS

(71) Applicant: Kemet Electronics Corporation, Simpsonville, SC (US)

(72) Inventors: Antony P. Chacko, Simpsonville, SC (US); John E. McConnell, Simpsonville, SC (US); Robert Ramsbottom, Simpsonville, SC (US); Philip M. Lessner, Simpsonville, SC (US); Randolph S. Hahn, Simpsonville, SC (US); John Bultitude, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 398 days.

(21) Appl. No.: 13/959,995

(22) Filed: Aug. 6, 2013

(65) Prior Publication Data

US 2013/0314845 A1    Nov. 28, 2013

Related U.S. Application Data

(63) Continuation-in-part of application No. 13/114,433, filed on May 24, 2011, now Pat. No. 8,896,986.
(Continued)

(51) Int. Cl.
*H01G 9/048* (2006.01)
*H01G 9/00* (2006.01)
(Continued)

(52) U.S. Cl.
CPC ............ *H01G 9/048* (2013.01); *H01G 9/0029* (2013.01); *H01G 9/012* (2013.01); *H01G 9/04* (2013.01);
(Continued)

(58) Field of Classification Search
CPC ........ H01G 9/048; H01G 9/0425; H01G 9/04; H01G 9/012; H01G 9/0029
See application file for complete search history.

(56) References Cited

U.S. PATENT DOCUMENTS 3,337,429 A * 8/1967 Zind .................... H01G 9/0036
                                                29/25.03
4,415,950 A * 11/1983 Weeks ..................... C09D 5/24
                                                29/25.03
(Continued)

FOREIGN PATENT DOCUMENTS

JP    58054965          3/1983
JP    59124709 A   *   7/1984
(Continued)

OTHER PUBLICATIONS

European Patent Office: Extended Search Report prepared for Application No. 11787450.3: Applicant: Kemet Electronics Corpation; dated Oct. 30, 2014.
(Continued)

*Primary Examiner* — David M Sinclair
(74) *Attorney, Agent, or Firm* — Joseph T. Guy; Perkins Law Firm, LLC

(57) ABSTRACT

A solid electrolytic capacitor is described which comprises an anode, a dielectric on the anode and a cathode on the dielectric. A conductive coating is on the cathode wherein the conductive layer comprises an exterior surface of a first high melting point metal. An adjacent layer is provided comprising a second high melting point metal, wherein the
(Continued)

first high melting point metal and the second high melting point metal are metallurgically bonded with a low melting point metal.

46 Claims, 3 Drawing Sheets

Related U.S. Application Data

(60) Provisional application No. 61/348,318, filed on May 26, 2010.

(51) Int. Cl.
*H01G 9/012* (2006.01)
*H01G 11/26* (2013.01)
*H01G 9/04* (2006.01)
*H01G 9/042* (2006.01)

(52) U.S. Cl.
CPC ........... *H01G 9/0425* (2013.01); *H01G 11/26* (2013.01); *Y10T 29/417* (2015.01)

(56) References Cited

U.S. PATENT DOCUMENTS

| | | | |
|---|---|---|---|
| 4,794,491 A * | 12/1988 | Saiki | H01G 9/08 361/532 |
| 5,062,896 A | 11/1991 | Huang et al. | |
| 5,424,909 A | 6/1995 | Kuriyama | |
| 5,830,389 A | 11/1998 | Capote et al. | |
| 5,853,622 A | 12/1998 | Gallagher et al. | |
| 5,922,397 A * | 7/1999 | Brandt | C25D 5/54 205/125 |
| 5,964,395 A | 10/1999 | Glovatsky et al. | |
| 5,968,209 A * | 10/1999 | Kono | H01G 9/04 216/6 |
| 6,068,782 A | 5/2000 | Brandt | |
| 6,081,416 A | 6/2000 | Trinh et al. | |
| 6,661,645 B1 * | 12/2003 | Sakai | H01G 9/012 29/25.03 |
| 6,704,189 B2 | 3/2004 | Yoshii et al. | |
| 6,916,433 B2 | 7/2005 | Mitani et al. | |
| 6,954,351 B2 * | 10/2005 | Konuma | H01G 9/012 29/25.03 |
| 6,972,943 B2 | 12/2005 | Kato et al. | |
| 6,975,503 B2 | 12/2005 | Abe et al. | |
| 7,108,729 B2 | 9/2006 | Kanetake | |
| 7,172,711 B2 | 2/2007 | Nguyen | |
| 7,471,504 B2 | 12/2008 | Takatani et al. | |
| 7,495,890 B2 | 2/2009 | Chacko | |
| 2004/0042157 A1 * | 3/2004 | Arai | H01G 9/012 361/523 |
| 2004/0240146 A1 | 12/2004 | Kayatani et al. | |
| 2005/0286208 A1 | 12/2005 | Ito et al. | |
| 2006/0151580 A1 | 7/2006 | Flint | |
| 2006/0215352 A1 * | 9/2006 | Take | H01G 9/012 361/523 |
| 2007/0047179 A1 | 3/2007 | Izu et al. | |
| 2008/0010797 A1 * | 1/2008 | Qiu | H01G 9/0036 29/25.03 |
| 2008/0116416 A1 | 5/2008 | Chacko | |
| 2008/0232035 A1 | 9/2008 | Biler | |
| 2009/0154068 A1 * | 6/2009 | Choi | H01G 9/012 361/533 |
| 2009/0185941 A1 | 7/2009 | Breznova | |
| 2009/0237865 A1 * | 9/2009 | Komazawa | H01G 9/012 361/528 |
| 2011/0292567 A1 * | 12/2011 | McConnell | B23K 1/0016 361/321.2 |

FOREIGN PATENT DOCUMENTS

| | | | |
|---|---|---|---|
| JP | 02106013 A | * | 4/1990 |
| JP | 04042914 | | 2/1992 |
| JP | 02283010 | | 11/1998 |
| JP | 11274003 A | * | 10/1999 |
| JP | 2005021974 | | 1/2005 |
| JP | 2009 224688 A | | 10/2009 |

OTHER PUBLICATIONS

Yeo, In Hong; International Preliminary Report on Patentability, PCT/US2011/038197, dated Sep. 11, 2012.
San Min Lee, Written Opinion of the International Searching Authority, PCT/US2011/038216, dated Dec. 26, 2011.
Sang Min Lee, International Search Report, PCT/US2011/038216, dated Dec. 26, 2011.

* cited by examiner

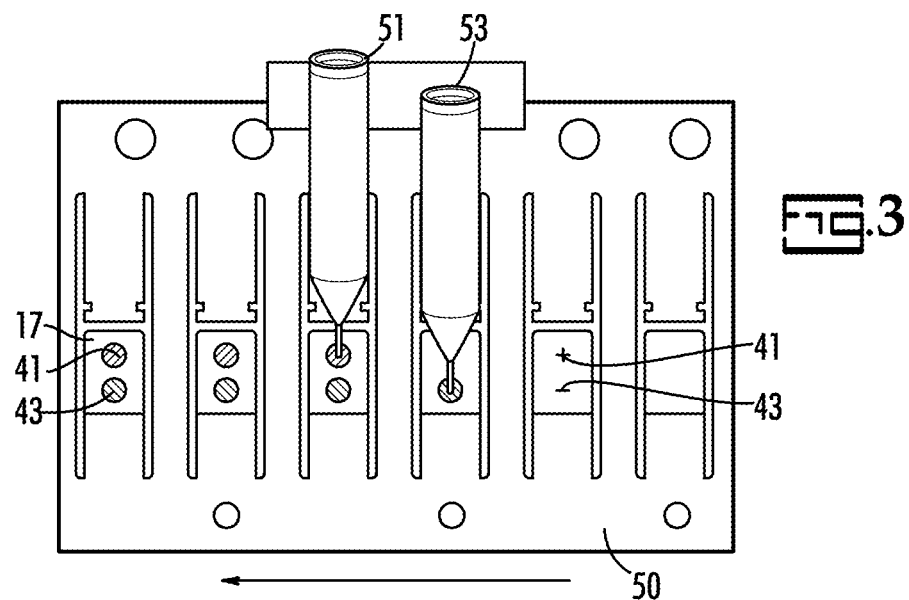
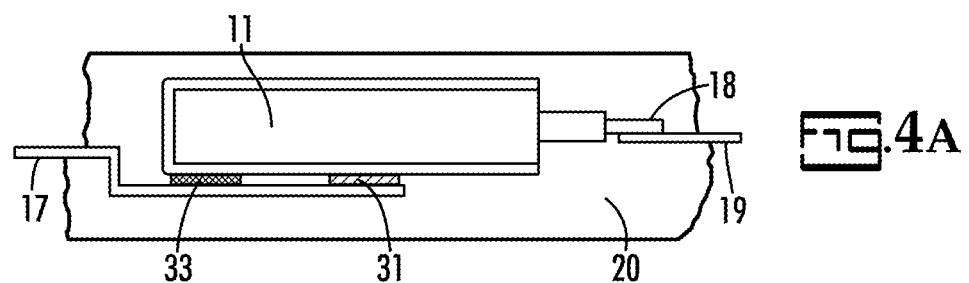
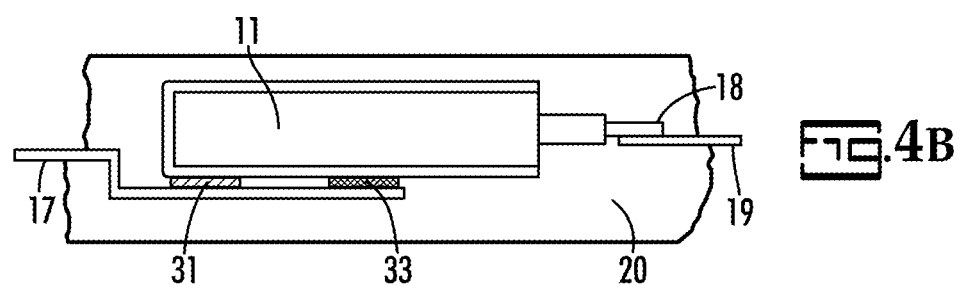

METHOD OF IMPROVING ELECTROMECHANICAL INTEGRITY OF CATHODE COATING TO CATHODE TERMINATION INTERFACES IN SOLID ELECTROLYTIC CAPACITORS

CROSS-REFERENCE TO RELATED APPLICATIONS

The present application is a Continuation-In-Part of pending U.S. patent application Ser. No. 13/114,433 filed May 24, 2011 which, in turn, claims priority to U.S. Provisional Application No. 61/348,318 filed May 26, 2010.

BACKGROUND

The present invention is related to an improved method of forming a solid electrolytic capacitor and an improved capacitor formed thereby. More specifically, the present invention is related to a method of improving the electrical and mechanical integrity of a cathode to a cathode lead or adjacent layer using a metallurgical adhesive or transient liquid phase sintering (TLPS) conductive adhesive to form metallurgical bonds thereby allowing for a stacked array of capacitors and leadless capacitors or leadless stacked capacitors.

The construction and manufacture of solid electrolytic capacitors is well documented. In the construction of a solid electrolytic capacitor a valve metal typically serves as the anode. The anode body can be either a porous pellet, formed by pressing and sintering a high purity powder, or a foil which is etched to provide an increased anode surface area. An oxide of the anode, which serves as the dielectric of the capacitor, is typically electrolytically formed to cover at least a majority of the surfaces of the anode. The solid cathode electrolyte is typically chosen from a very limited class of materials, to include manganese dioxide and intrinsically conductive polymers such as polyaniline, polypyrrole, polythiophene, etc. The solid cathode electrolyte is applied so that it covers at least a majority of the dielectric surfaces. An important feature of the solid cathode electrolyte is that it can be made more resistive by exposure to high temperatures. This feature allows the capacitor to heal leakage sites by Joule heating. The solid electrolyte is typically not readily adhered to a lead frame or circuit trace, so in addition to the solid electrolyte the cathode of a solid electrolyte capacitor typically comprises several layers which are external to the solid electrolyte to facilitate adhesion. These layers typically include a carbon layer; a layer containing a highly conductive metal, typically silver, bound in a polymer or resin matrix; a conductive adhesive layer such as solder or a silver adhesive which is then adhered to a highly conductive metal lead frame. It is important that the solid electrolyte be of sufficient buildup and density to prevent the layers overlaying the solid electrolyte from penetrating the solid electrolyte and contacting the dielectric. One reason for this is that these outer layers do not necessarily exhibit the healing properties required for a material directly in contact with the dielectric. Thus, the ability to control the buildup, morphology, uniformity, and density of the solid electrolyte is critical to manufacturing a reliable solid electrolytic capacitor. The various layers of the external cathode also serve to protect the dielectric from thermo-mechanical damage that may occur during subsequent processing, board mounting, or customer use.

In the case of conductive polymer cathodes the conductive polymer is typically applied by chemical oxidation polymerization, electrochemical oxidation polymerization, spray techniques or dipping in a slurry of preformed polymer with other less desirable techniques being reported.

The carbon layer serves as a chemical buffer between the solid electrolyte and the silver layer. Critical properties of the carbon layer include adhesion to the underlying layer, wetting of the underlying layer, penetration of the underlying layer, bulk conductivity, interfacial resistance, compatibility with the silver layer, suitable buildup, and suitable mechanical properties.

The silver layer, or a suitable very high conductive layer, serves to conduct current to the lead frame from the areas of the cathode not directly connected to the lead frame. The critical characteristics of this layer are high conductivity, adhesive strength to the carbon layer, wetting of the carbon layer, and suitable mechanical properties. Compatibility with the subsequent layers employed in the assembly and encapsulation of the capacitor are also critical.

An electrically conductive adhesive is used to attach the cathode layer to a lead frame. The electrical properties of the capacitor can be affected if the mechanical integrity of the adhesive/lead frame connection is degraded during assembly and post assembly processing. The adhesive properties of the conductive adhesive, the solder coating on the lead frame, the surface characteristics of the lead frame, the coefficient of thermal expansion of the lead frame, etc., need to be carefully controlled in order to obtain durable negative connection integrity. The adhesive/lead frame interface is subjected to various thermo mechanical stresses during molding, curing, aging, surface mount testing, solder reflow, etc. These thermo mechanical stresses, and the low adhesive strength of the conductive adhesive, often cause a break in the electrical contact between the cathode and lead frame. Adhesives with higher adhesive strengths and lower concentration of conductive particles are able to withstand the stress and maintain mechanical integrity. However, there is a trade-off between increasing adhesion and increasing electrical conductivity.

Conductive adhesives are heavily filled with silver particles to get maximum conductivity. Increasing the silver loading will improve the electrical properties but decreases binder/resin concentration in the adhesive which is detrimental to adhesion. Increasing the resin portion will increase adhesion but to the detriment of electrical properties, particularly, conductivity.

U.S. Pat. No. 6,972,943 attempts to circumvent the conflict between adhesion and conductivity of the adhesive by modifying the lead frame surface. The method of the invention in the patent provides grooves and holes in the lead frame so as to have good mechanical integrity between the two surfaces.

U.S. Pat. No. 6,916,433 attempts to improve performance by using conductive fillers with dendrites or protrusions to enhance contact with electrodes and an elastic adhesive resin for enhanced flexibility. The preferred elastic adhesive is a thermosetting resin comprising denatured silicon resin with a dispersed epoxy resin, available from Cemedyne Co. Ltd.

U.S. Pat. No. 7,495,890 disclosed a method of improving cathode connection integrity by using secondary adhesives. Although this method improves the cathode connection integrity, higher temperature adhesion performance is limited by the thermal softening temperatures of the polymeric materials in these adhesives.

The polymeric resin in these adhesives helps to form adhesive bonds between the highly conductive cathode layer and the lead frame. One of the weaknesses of the polymeric resin is that they tend to degrade at high temperatures which affects the cathode connection integrity. Another weakness of these metal particle filled adhesives is that the conduction mechanism is percolation assisted by forming a connection between binder coated particles. Due to this binder interference, stable interconnection with the lead frame or between particles is an issue especially when these parts are subjected to thermal, mechanical or environmental stress. On humidity exposure, moisture absorbed by the binders can swell the binders causing an increase in equivalent series resistance (ESR) due to increased silver particle to silver particle distance. Silver migration is another issue when the conductive adhesive is a silver filled adhesive. Silver migration can lead to an increase in leakage current and an increase in ESR. Solders can be used for forming a metallurgical bond between the lead frame and the cathode layer. However, most of the solders available are not suitable for high temperature applications either due to their low melting point or due to the presence of lead (Pb). A need therefore exists for improved reliability cathode connections for high temperature applications.

Through diligent research the present inventors have developed a method of improving high temperature adhesive strength between the cathode layer and an adjacent layer.

SUMMARY

It is an object of the present invention to provide a capacitor with increase adhesion between the cathode layer and an adjacent layer which may be a lead frame, an adjacent capacitor, a mounting tab or a circuit trace.

It is another object of the present invention to provide a capacitor with improved high temperature adhesion performance.

A particular feature of the present invention is the ability to provide improvements with minor changes to the manufacturing method and with improved product yields due to improved thermo mechanical and electrical properties.

It is another object of the present invention to provide a capacitor which maintains an electrically stable interface between the cathode and adjacent layer when exposed to high humidity.

It is another object of the present invention to provide a capacitor wherein adhesion between the cathode and adjacent layer can be done rapidly thereby increasing manufacturing efficiencies.

Yet another advantage is provided in the ability to form stacked capacitors which increases capacitance per unit volume.

Yet another advantage is provided in the ability to mount the capacitors directly to a circuit board, without a lead frame, either individually or as a stack thereby increasing capacitance per unit volume and minimizing ESR.

These and other advantages, as will be realized, are provided in a solid electrolytic capacitor. The capacitor comprises an anode and a dielectric on the anode. A cathode is on the dielectric and a conductive coating on said dielectric. A cathode lead is electrically connected to the conductive coating by an adhesive selected from the group consisting of a transient liquid phase sinterable material and polymer solder.

Yet another embodiment is provided in a method for forming a capacitor. The method includes the steps of:
providing an anode;
forming a dielectric on the anode;
applying a cathode on the dielectric; and
electrically connecting a cathode lead to the cathode with an adhesive selected from the group consisting of a transient liquid phase sinterable material and polymer solder.

Yet another embodiment is provided in a solid electrolytic capacitor. The capacitor has an anode and a dielectric on the anode. A cathode is on the dielectric and a conductive coating is on the cathode. A cathode lead is electrically connected to the conductive coating by a metallurgical bond formed from a transient liquid phase sintered material which is preferable formed under compression.

Yet another advantage is provided in a solid electrolytic capacitor comprising an anode, a dielectric on the anode and a cathode on the dielectric. A conductive coating is on the cathode wherein the conductive layer comprises an exterior surface of a first high melting point metal. An adjacent layer is provided comprising a second high melting point metal, wherein the first high melting point metal and the second high melting point metal are metallurgically bonded with a low melting point metal.

Yet another embodiment is provided in a method for forming a capacitor comprising the steps of:
providing an anode;
forming a dielectric on the anode;
applying a cathode on the dielectric;
plating a high melting point metal on the cathode; and
forming a metallurgical bond between the high melting point metal and an adjacent layer with a low melting point metal.

Yet another embodiment is provided in a capacitor stack comprising at least two solid electrolytic capacitors. Each solid electrolytic capacitor comprises an anode a dielectric on the anode and a cathode on the dielectric. A conductive coating is on the cathode wherein the conductive layer comprises an exterior surface of a high melting point metal. A metallurgical bond is between adjacent exterior surfaces wherein the metallurgical bond comprises the high melting point metal and a low melting point metal.

BRIEF DESCRIPTION OF THE DRAWINGS

FIG. 3 is a schematic representation of an embodiment of the invention.

FIGS. 4A and 4B are cross-sectional schematic view of an embodiment of the invention.

DETAILED DESCRIPTION

Figure 1:
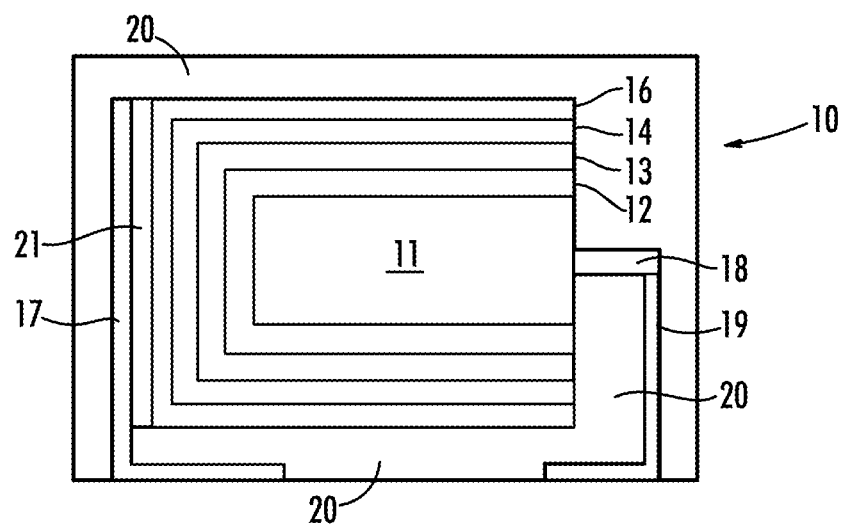
FIG. 1 is a cross-sectional schematic view of an embodiment of the invention.

The present invention mitigates the deficiencies of the prior art by providing a capacitor with an improvement in adhesion to the cathodic lead frame through the use of a metallurgical adhesive selected from transient liquid phase sintering and polymer solder adhesives. The metallurgical adhesives increase productivity without detriment to the electrical properties of the capacitor.

It has now been found that metallurgical adhesives can be used for attaching solid electrolytic cathode layers to an adjacent layer such as a lead frame, a mounting pad, a circuit trace or an adjacent cathode. It has also been found that the metallurgical adhesives form a metallurgical bond between a cathode layer and adjacent layer. In a particularly preferred embodiment a solid electrolytic capacitor with a metal plated cathode, preferably a nickel plated cathode, forms metallurgical bonds at the interfaces when the metallurgical adhesives or TLPS are incorporated. The metal plated layer is preferably applied by reverse bias electroplating.

Metallurgical adhesives are conductive adhesives which make interconnection through metallic bonds instead of chemical bonds as in metal filled polymeric adhesives. Because the metal particles in these adhesives are sintered together, these adhesives enable conduction by metallic conduction instead of percolation assisted conduction as in metal filled polymeric adhesives. For the purposes of this disclosure metallurgical adhesives include transient liquid phase sinterable materials and polymer solder. By using these metallurgical adhesives, metallurgical bonds can be formed between the lead frame and the cathode layers.

Transient liquid phase sinterable adhesives are blends of low temperature melting metals or alloys and high temperature melting metals or alloys which can be sinterable at low temperatures. Transient liquid phase sintering conductive adhesive formulations disclosed in U.S. Pat. No. 5,853,622 combine TLPS materials with cross linking polymers to create a thermal and electrical bond having intermetallic interfaces between the metal surfaces created by the TLPS process. The spraying of two mating surfaces with a low temperature melting material on one surface and a higher melting temperature on the mating surface, with both surfaces being compatible with the TLPS process, thereby forming a joint when heating to the melting point of the lower temperature material is discussed in U.S. Pat. No. 5,964,395. These patents describe the materials and processes of TLPS with respect to forming a conductive bond.

Transient Liquid Phase Sintering adhesives are conductive materials that are distinguished from solders. Solders are alloys which do not undergo a change in composition during reflow. TLPS materials are mixtures of two or more metals or metal alloys prior to exposure to elevated temperatures. The second distinguishing characteristic of TLPS materials is that the melting point of the material is dependent on the thermal history of the material. TLPS materials exhibit a low melting point prior to exposure to elevated temperatures, and a higher melting point following exposure to these temperatures. The initial melting point is the result of the low temperature metal or an alloy of two low temperature metals. The second melting temperature is that of the intermetallic formed when the low temperature metal or alloy, forms a new alloy with a high temperature melting point metal thereby creating an intermetallic having a higher melting point. TLPS materials form a metallurgical bond between the metal surfaces to be joined. Unlike tin/lead or Pb free solders, the TLPS conductive adhesives do not spread as they form the intermetallic joint. Rework of the TLPS system is very difficult due to the high secondary reflow temperatures.

A transient liquid phase sinterable adhesive can be used to attach a plated metal layer of a cathode to a cathode lead or to attach adjacent plated metal layers such as a mounting tab or adjacent cathode in a stack of capacitors. Commercially available transient liquid phase sinterable adhesive used in the electronics industry are filled with a mixture of low melting metals or alloys and high temperature melting metals or alloys. In addition to these sinterable metallic components, some amount of curable organic materials may be present to provide fluxing action and some initial tackiness, however, with TLPS a flux is not desirable. Transient liquid phase sinterable adhesives are available from Ormet Circuits Inc. and Creative Electron as noted suppliers.

TLPS comprise high temperature materials selected from copper, silver, aluminum, gold, platinum, palladium, beryllium, rhodium, nickel, cobalt, iron and molybdenum or a mixture or any combination thereof are suitable for use in transient liquid phase sintering conductive adhesives. High melting temperature materials have a melting point of at least 600° C.

TLPS further comprise a low melting temperature materials selected from tin, antimony, bismuth, cadmium, zinc, gallium, indium, tellurium, mercury, thallium, selenium, or polonium, or a mixture or an alloy of any two or more of these. Low melting temperature materials have a melting point of no more than 500° C.

A particularly suitable embodiment is either silver or copper as the high temperature component and a tin-bismuth alloy as the low temperature component. Another particularly suitable embodiment is nickel as the high temperature component and tin as the low temperature component.

The transient liquid phase sintering conductive adhesives are compatible with surface finishes containing silver, tin, gold, copper, platinum, palladium, nickel, or combinations thereof, either as lead frame finishes, component connections or inner electrodes to form an electronically conductive metallurgical bond between two surfaces. Suitable external lead or lead frame materials include phosphor bronze, copper, alloys of copper such as but not limited to beryllium copper, Cu194 and Cu192, as well as lead frames consisting of ferrous alloys such as but not limited to Alloy 42 and Kovar.

With transient liquid phase sintering adhesives in paste form thermocompression bonding can be used to increase densities in the bond thereby forming more reliable joints than relying on temperature alone.

A particular advantage is the ability to use a low process time of 15 to 60 seconds at a temperature in the range of 225° C. to 300° C. in a single step making it suitable for automation. Robust joints can be created for the application of attaching external leads to the cathode or for attaching adjacent cathodes using Transient Liquid Phase Sintering conductive adhesives with a one-step low temperature in less than 60 seconds and in combination with thermocompression bonding.

A polymer solder can be used to form metallurgical bonds between the plated metal cathode layer and the cathode lead. Polymer solder provides suitable solder wetting, particularly, on plated cathode layers. Thermosetting polymer in combination with high temperature alloy provides higher temperature properties. Henkel supplies such adhesives as epoxy solder.

Polymer solders may consist of conventional solder systems based on Pb/Sn alloy systems or more preferably lead free systems, such as Sn/Sb, which are combined with cross linking polymers which serve as cleaning agents. The cross-linked polymers also have the ability to form a cross linked polymer bond, such as an epoxy bond, that forms during the melting phase of the metals thereby forming a solder alloy and a mechanical polymeric bond. An advantage of polymer solders is that the polymeric bond provides additional mechanical bond strength at temperatures above the melting point of the solder, thus giving the solder joint a higher operating temperature in the range of about 5 to 30° C. above the melting point of the solder. Polymer solders combine current solder alloys with a cross linking polymer within the same paste to provide both a metallurgical bond and a mechanical bond when cured, such as by heating, to provide additional solder joint strength at elevated temperatures. However, the upper temperature limits and joint strength has been increased, just by the physical properties of the materials. A practical limit of 300° C. remains whereas the Transient Liquid Phase Sintering Conductive Adhesives can achieve higher temperatures.

Thermo compressive bonding is also a particularly preferred processing method when using polymer solder because it assists in the formation of a high density metallurgical bond between the contacting surfaces. The advantages of a thermo-compression include a more robust bond with respect to secondary attachment processes and attachments with higher strength are achieved.

A compression force of 0.5 to 4.5 Kilograms/cm$^2$ (7.1 to 64 psi) and more preferably 0.6 to 0.8 Kilograms/cm$^2$ (8.5 to 11 psi) is sufficient for demonstration of the thermo-compression teachings herein. About 0.63 Kilograms/cm$^2$ (9 psi) is a particularly suitable pressure for demonstration of the teachings.

The present invention will be described with reference to the various figures which illustrate, without limiting, the invention.

In FIG. 1, a cross-sectional schematic view of a capacitor is shown as represented at 10. The capacitor comprises an anode, 11, preferably comprising a valve metal as described herein. A dielectric layer, 12, is provided on the surface of the anode, 11. The dielectric layer is preferably formed as an oxide of the valve metal as further described herein. Coated on the surface of the dielectric layer, 12, is a conductive layer, 13. The conductive layer preferably comprises conductive polymer, such as polyethylenedioxythiophene (PEDT), polyaniline or polypyrrole or their derivatives; manganese dioxide, lead oxide or combinations thereof. A carbon layer, 14, a plated layer, 16, provides electrical conductivity and provide a surface which is more readily adhered to the cathode terminal, 17, than is the cathode layer, 13. The metallurgical adhesive layer, 21, secures the cathode lead to the silver layer or plated layer. The plated layer can be from sputtered metal, chemical vapor deposited metal or electroplated metal with reverse bias electroplating most preferable.

The carbon layer together with the silver layer and adhesive layer provides a strongly adhered conductive path between the conductive layer, 13, and the cathode terminal, 17. An anode wire, 18, provides electrical contact between the anode, 11, and an anode terminal, 19. The entire element, except for the terminus of the terminals, is then preferably encased in a non-conducting material, 20, such as an epoxy resin.

The capacitor is illustrated in FIG. 1 as a discrete capacitor. In an alternate embodiment the anode wire, 18, and plated layer, 16, may be in direct electrical contact with a circuit trace wherein elements of the circuit may constitute the cathode lead, anode lead or both. The capacitor may be embedded in a substrate or incorporated into an electrical component with additional functionality.

The carbon layer comprises a conductive composition comprising resin and carbon conductive particles. The carbon layer may also comprise adjuvants such as crosslinking additives, surfactants and dispersing agents. The resin, conductive carbon particles and adjuvants are preferably dispersed in an organic solvent or water to form a coating solution. The conductive carbon particles are preferably dispersed in an organic solvent. Preferably the organic solvent is present in an amount of 20-90 wt %. More particularly the organic solvent is present in an amount of 40-60 wt %. The organic solvent is preferable selected from glycol ethers, glycol ether ester, N-methylpyrrolidone, dimethyl formamide, xylene, etc. A particularly preferred solvent is glycol ether ester due to the good polymer solubility and high boiling point.

The plated layer provides a layer which is readily adhered to the lead frame. A silver layer comprises silver and a resin. It is most preferable that the silver layer be at least 5 μm thick. The silver composition of the silver layer is preferably about 40 wt % to no more than about 95 wt % based on the dry weight. Below about 40 wt % the conductivity is inadequate and above about 95 wt % the adhesion is unacceptable. It is more preferred that the silver content of the silver layer be at least 85 wt % to no more than 95 wt %. A plated metal layer selected from silver, tin, gold, copper, platinum, palladium, nickel or combinations thereof be used instead of silver layer and is preferred. A particularly preferred plated layer is nickel. It is most preferable that the plate layer consist essentially of a high temperature melting metal with the layer preferably be a layer formed by sputtering or electroplating.

The metallurgical adhesive is typically used to adhesively attach the plated metal layer to the lead frame which acts as the cathode lead or to an adjacent layer.

Figure 2:
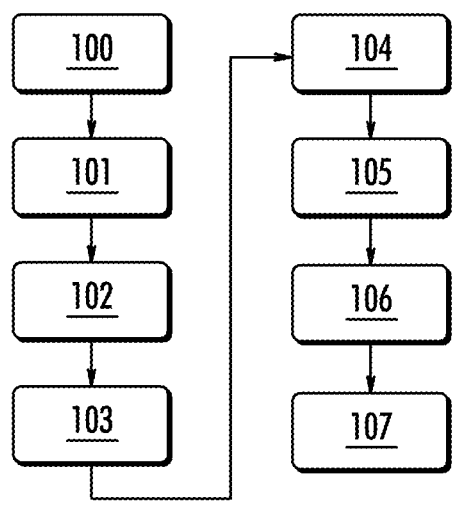
FIG. 2 is a flow chart representation of an embodiment of the invention.

The process for forming the capacitor is illustrated in FIG. 2.

In FIG. 2, the anode is formed at 100. The anode is a conductive material preferable formed from a valve metal or a conductive oxide of a valve metal. The valve-metal is preferably selected from niobium, aluminum, tantalum, titanium, zirconium, hafnium, tungsten and alloys or combinations thereof. Aluminum, tantalum, niobium and NbO are particularly preferred. Aluminum is typically employed as a foil while tantalum, niobium and niobium oxide are typically prepared by pressing a powder and sintering the powder to form a compact. For convenience in handling, the valve metal is typically attached to a carrier thereby allowing large numbers of elements to be processed at the same time. The anode is preferably etched to increase the surface area particularly if the anode is a foil such as aluminum foil. Etching is preferably done by immersing the anode into at least one etching bath. Various etching baths are taught in the art and the method used for etching the valve metal is not limited herein.

A dielectric is formed on the surface of the anode at 101. It is most desirable that the dielectric layer be an oxide of the anode metal. The oxide is preferably formed by dipping the anode into an electrolyte solution and applying a positive voltage to the anode. Electrolytes for the oxide formation can include ethylene glycol; polyethylene glycol dimethyl ether as described in U.S. Pat. No. 5,716,511; alkanolamines and phosphoric acid, as described in U.S. Pat. No. 6,480, 371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the oxide on the valve metal including aqueous solutions of dicarboxylic acids, such as ammonium adipate are also known. Other materials may be incorporated into the oxide such as phosphates, citrates, etc. to impart thermal stability or chemical or hydration resistance to the oxide layer.

A conductive layer is formed, 102, on the surface of the oxide. The conductive layer acts as the cathode of the capacitor. The cathode can be an organic material such as 7,7',8,8'-tetracyanoquinodimethane complex. Particularly, the cathode can be intrinsically conducting polymers. Mentioned as exemplary polymers are polymerized aniline, polymerized pyrrole, polymerized thiophenes, and derivatives thereof. The cathode layer can also comprise manganese dioxide. The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

A particularly preferred conducting polymer is illustrated in Formula I:

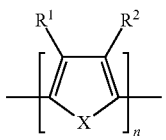

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

A particularly preferred polymer is 3,4-polyethylene dioxythiophene (PEDT).

The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art or by dipping into a slurry of polymer.

After conductive cathode layer formation, 102, a carbon layer is preferably applied, 103, preferably by spraying or dipping.

A plated metal layer, such as nickel or silver, is applied, 104, onto the carbon layer. The layer can be form by electroplating, vapor deposition, or by dipping.

It is preferred that each layer formed from a liquid or slurry be at least partially dried prior to coating of the subsequent layer thereon. Alternatively, the layers may be coated in a wet-on-wet fashion with adequate surface tension in each layer to prohibit substantial mixing of the layers. The layers can then be dried, or cured, simultaneously.

The conductive layer may also comprise layers comprising conductive particle filled layers. Particularly preferred conductive particles include carbon black, graphite, graphene, carbon nanotubes, metal particles, carbon coated metal particles and metal coated carbon particles. The metal particles are preferably selected from Ag, Cu, Ni, Sn, In, Bi, Sb, Au or Pd. The metal coating on carbon particles may be a high melting metal or a low melting metal and incorporated into a TLPS bond as described herein.

The conductive layer, which has on the surface a high melting point metal and preferably a silver or nickel layer, is adhered to the lead frame, 105, with the metallurgical adhesive there between. When the metallurgical adhesive is transient liquid phase sintering adhesive a mixture of the high melting component and low melting component can be applied to either the cathode or the lead frame with the lead frame being preferred. In an alternative embodiment the high melting component and low melting component can be applied to surfaces which are to be joined such as a lead frame, mounting tab or adjacent cathode layer in a stack. By way of example, the high melting component can be applied to the lead frame with the low melting component applied to the layers associated with the cathode. When the cathode and lead frame are brought into intimate contact and heated above the melting point of the low melting component an alloy is formed thereby forming a metallurgical bond. Alternatively, the high melting component can be applied to the cathode and the low melting component applied to the lead frame. Alternatively, a malleable coupon comprising at least the low melting point metal can be inserted between the surfaces to be joined. The coupon may comprise a high melting and a low melting metal wherein bridges of alloy are formed between the adjacent surfaces. The high melting point metals and low melting point metals may be pellets with the high melting metal as a core and the low melting metal as a shell.

The capacitor is finished by incorporating anode terminals, 106, and external insulators, 107, as known in the art.

The metallurgical adhesive is added, preferably to the cathode lead of the lead frame, by passing the cathode under adhesive dispensers which deposit metallurgical adhesive as desired prior to joining the cathode lead with cathode side of the capacitor. It is preferable to utilize two dispensers wherein they may both dispense metallurgical adhesive or metallurgical adhesive components or alternatively one may dispense a metallurgical adhesive with another dispensing a secondary adhesive as will be described herein. For larger case sizes, additional adhesive may be applied in additional locations. It is most preferred that any secondary or additional adhesive, which is not a conductive adhesive, be a snap cured adhesive as described in commonly assigned U.S. Pat. No. 7,554,793 which is incorporated herein by reference.

FIG. 3 illustrates a process for applying the adhesives. Cathode terminal, 17, which may be one of many such on a master plate, 50, passes under adhesive dispensers, 51 and 53, which deposit adhesive on the positive side, 41, or on the negative side, 43, as desired prior to joining the terminal with the cathode side of the capacitor. It would be realized that the dispensers may both dispense a metallurgical adhesive, a component of the metallurgical adhesive in a common location, or one of the dispensers may dispense a secondary adhesive.

FIGS. 4A and 4B illustrate a method for utilizing the invention. In FIG. 4A a secondary adhesive, 33, is applied on the negative side of the negative lead and a metallurgical adhesive, 31, is applied to the positive side. In FIG. 4B the positions of the metallurgical adhesive and secondary adhesives are reversed.

The resin for the secondary adhesive layer is a silver filled rapid curing resin comprising about 60-95 wt % silver and 5-40 wt % resin. The resin comprises 55-98.9 wt % epoxy monomer, 0.1-15 wt % catalyst, 1-30 wt % accelerant and up to 15 wt % filler.

Figure 5:
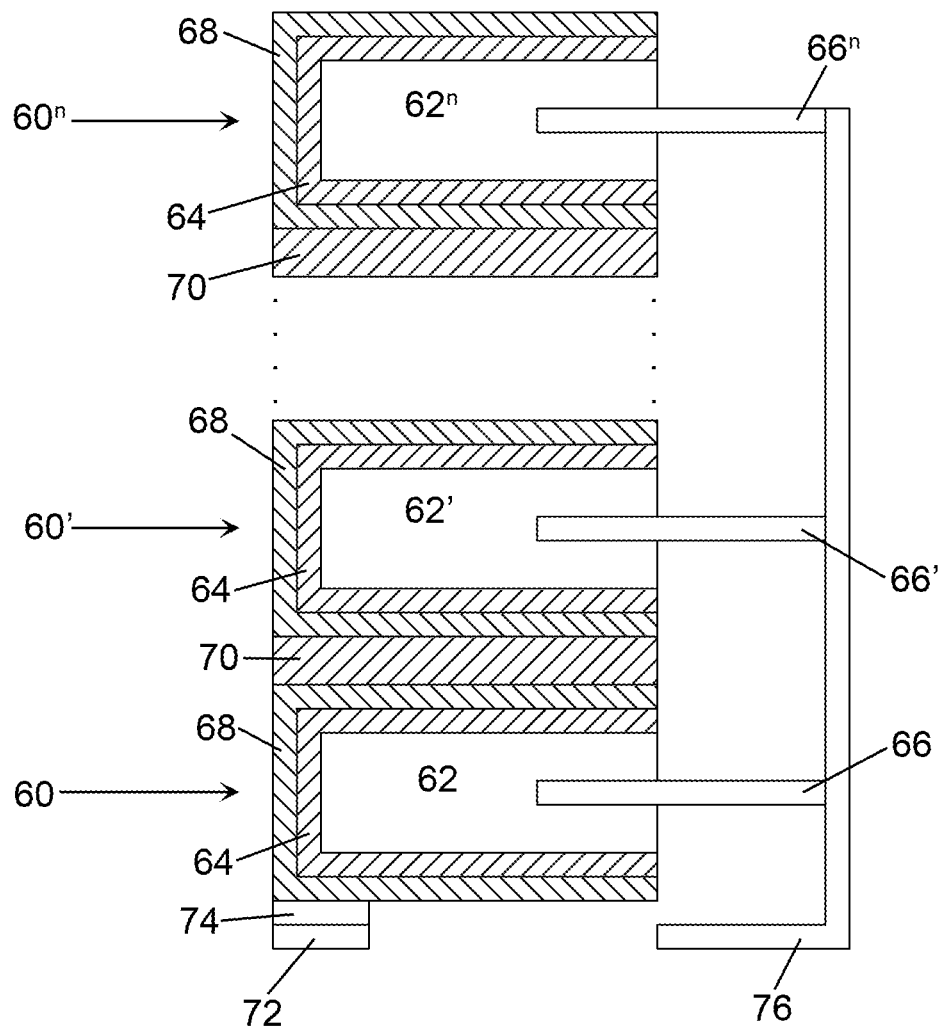
FIG. 5 is a schematic cross-sectional view of an embodiment of the invention.

An embodiment of the invention is illustrated in cross-sectional schematic view in FIG. 5. In FIG. 5, a multiplicity of solid electrolytic capacitors, 60, are arranged in a stack prior to heating. Each solid electrolytic capacitor comprises anodes, 62 and 62'-62'', each with a dielectric, 64, on the anode and preferable encasing the anode. An anode wire, 66, extends from the anode. A cathode, 68, is on the dielectric and preferably covers as much of the dielectric as possible with the proviso that the cathode does not make direct electrical contact with the anode as would be realized. At least the surface layer is a TLPS compatible high melting point metal. Adjacent cathodes are bonded by a metallurgical bond formed as an alloy of a low melting point metal in a bonding layer, 70, and a high melting point metal as the surface layer of the cathode. The bonding layer may be a coupon as described elsewhere herein. A mounting tab, 72, is optional but preferred. Alternatively, the mounting tab may be a circuit trace with the cathode mounted directly to the circuit trace. The mounting tab preferably has at least a surface coating of a second TLPS compatible high melting point metal which is preferably the same as the TLPS compatible high melting point metal on the surface of the cathode. A metallurgical bond is formed between the mounting tab and the cathode as an alloy of a second low melting point metal, 74, and the TLPS compatible high melting point metals on the surfaces of the cathode and mounting tab. An anode lead, 76, is electrically connected to each anode wire, 66. The anode lead and mounting tab are attached to a circuit trace. While illustrated as a stack a single capacitor can be formed with a metallurgical bond between the cathode and either a mounting tab or a circuit trace. The capacitor, or stack of capacitors, can be encased in a non-conducting material, such as an epoxy resin, either prior to mounting or after mounting on a circuit board.

EXAMPLES

Peel strength testing is used to measure the force required to separate the cathode lead from the cathode. The test can be performed at room temperature, which is referred to as cold peel, or at 162° C., which is referred to as hot peel.

To measure peel strength, a sample strip is placed onto a load plate via locator pins and spring loaded hold down bars. If a hot peel test is to be measured, a heater is turned on with the load plate in the test chamber for a specified time to achieve thermal equilibrium. When ready, the first strip can be loaded and moved into the tester, with the lead-frame side up, where it should wait 1 minute before testing. The first part to be tested is aligned under a pin affixed to a Chatillion gauge. It is aligned to an area where the pin will contact as close to the center of the cathode as possible. The pin shall not contact the lead frame. Once the test has started, the pin will push down on the cathode and the break force is displayed on the gauge. The strip can be repositioned at a minimum distance to each part for additional sampling.

Example 1

A series of identical tantalum anodes were prepared. The tantalum was anodized to form a dielectric on the tantalum anode. A set of samples with a polymeric cathode utilizing polyethylenedioxythiophene (PEDT) was formed on the dielectric and carbon layers were applied. This group of samples were divided into three groups. In the first group a silver layer was applied on the carbon layers. In the second group a nickel layer was plated onto the carbon layer. In a third group, a silver layer was applied followed by a plated metal. The capacitors with polymeric cathode, carbon and various cathode coatings were further split into two groups. In a control group a conventional silver filled polymeric conductive adhesive was applied to the tin lead frame and the capacitor adhered thereto. In the inventive group a transient liquid phase sinterable materials, provided by Ormet Circuits Inc. as CS328, was applied to the lead frame. Both the control and inventive samples were cured at 270° C. for 20 seconds. Some of the parts from the control and the inventive samples were subjected to a hot peel strength test and some were molded and formed for electrical tests. The results of the hot peel test are provided in Table 1. The control samples had average hot peel strength of only 0.07 Kg versus an average of 42 Kg for the inventive samples. The equivalent series resistance (ESR) of both the control and inventive groups were similar. It can be seen that a synergistic improvement in peel strength is observed when nickel coating and transient liquid phase sinterable adhesive were used in conjunction.

TABLE 1

Peel strength at 165° C. for prior art conductive adhesives and metallurgical adhesive

| Cathode coating/adhesive/cathode lead construction | Hot peel (Kg) |
| --- | --- |
| Silver coating/silver filled adhesive/Sn LF | 0.07 |
| Silver coating/TLPS adhesive/Sn LF | 0.07 |
| Nickel coating/silver filled adhesive/Sn LF | 0.07 |
| Nickel coating/TLPS adhesive/Sn LF | 0.43 |
| Silver coating/Nickel coating/TLPS adhesive/Sn LF | 0.41 |

Example 2

A series of identical tantalum anodes were prepared. The tantalum was anodized to form a dielectric on the tantalum anode. A manganese dioxide cathode was formed on the dielectric and carbon layers were formed on the manganese dioxide cathode. This group was further divided into two groups. In the first group a silver layer was applied on the carbon. In the second group, a nickel layer was plated on the carbon. These capacitors with the various cathode coating on manganese dioxide cathode were split into two groups. In a control group a snap cure silver filled thermoset adhesive was applied to a lead frame and the capacitor adhered thereto. In the inventive group a polymer solder, referred to as epoxy solder CEP 20048 from Henkel was applied onto the lead frame. Some of the parts from the control and the inventive samples were subjected to a hot peel strength test and some were molded and formed for electrical tests. The results of the peel strength test are provided in Table 2. ESR of the both control and inventive groups were similar.

TABLE 2

Peel strength at room temperature and 165° C. for prior art conductive adhesives and metallurgical adhesive

| Cathode coating/adhesive/Cathode lead construction | RT peel strength (Kg) | 165 C. Peel Strength (Kg) |
| --- | --- | --- |
| Silver coating/silver filled adhesive/Sn LF | 0.68 | 0.32 |
| Nickel coating/silver filled adhesive/Sn LF | 1.77 | 0.34 |
| Nickel coating/epoxy solder/Sn LF | 2.99 | 1.44 |

Example 3

A series of identical tantalum anodes were prepared. The tantalum was anodized to form a dielectric on the tantalum anode. A manganese dioxide cathode was formed on the dielectric and carbon layers were formed on the manganese dioxide cathode. This group was further divided into two groups. In the first group a silver layer was applied on the carbon. In the second group, a nickel layer was plated on the carbon. These capacitors with the various cathode coating on manganese dioxide cathode were split into two groups. In a control group a snap cure filed thermoset adhesive was applied to a lead frame and the capacitor adhered thereto. In the inventive group a transient liquid phase sinterable materials, provided by Ormet Circuits Inc. as CS328, was applied to the lead frame. Some of the parts from the control and the inventive samples were subjected to a 75 C/90% RH humidity test. The results of the ESR shift after exposure to humidity test are provided in Table 3. It can be seen that a synergistic improvement in ESR stability for humidity exposed parts is observed when nickel coating and transient phase sinterable adhesive were used in conjunction.

TABLE 3

Percentage ESR shift after humidity exposure

| Cathode coating/adhesive/Cathode lead construction | Percentage ESR shift after 2600 hrs. @75 C./90% RH |
|---|---|
| Silver coating/silver filled adhesive/Sn LF | 462 |
| Nickel coating/silver filled adhesive/Sn LF | 183 |
| Nickel coating/TLPS adhesive/Sn LF | 98 |

Example 4

A solid electrolytic capacitor with a nickel plating layer was and a lead frame with a nickel plating layer were bonding using tin as the low melting point metal there between. The sample was heated to 500° C. with no noticeable endotherm at the melting point of the tin indicating the formation of an alloy such as the unconfirmed alloy $Ni_3Sn_5$. The bonded part was heated to 300° C. over a period of about 600 minutes and allowed to cool to ambient while the resistance was constantly measured. There was very little deviation in resistance.

Example 5

A series of identical tantalum anodes were prepared. The tantalum was anodized to form a dielectric on the tantalum anode. A conductive polymer cathode was formed on the dielectric and carbon layers were formed on the conductive polymer cathode. Copper was plated on the carbon layer. These capacitors with the various cathode coating on conductive polymer cathode were split into four groups. In a control group a silver filled thermoset adhesive was applied to a lead frame and the capacitor adhered thereto. In the inventive group a low melting metal (In) paste was applied to the lead frame. In addition to the control and inventive groups, two more groups were prepared with TLPS adhesive (Ormet) and a high temperature tin-antimony solder. The parts were assembled using copper plated lead frame and ESR was measured. Results are shown in Table 5.

TABLE 5

| | ESR (milli ohm) |
|---|---|
| Copper plating/Ag adhesive | 18.47 |
| Copper plating/Indium | 16.18 |
| Copper plating/TLPS | 16.27 |
| Copper plating/solder | 19.55 |

The invention has been described with particular reference on the preferred embodiments. One of skill in the art would realize additional embodiments, alterations, and advances which, though not enumerated, are within the invention as set forth more specifically in the claims appended hereto.

The invention claimed is:

1. A solid electrolytic capacitor comprising:
   an anode;
   a dielectric on said anode;
   a cathode on said dielectric;
   a plated metal layer on said cathode wherein said plated metal layer comprises an exterior surface of a first high melting point metal; and
   an adjacent layer selected from a circuit trace and a lead wherein said adjacent layer comprises a second plated metal layer comprising a second high melting point metal wherein said first high melting point metal and said second high melting point metal are directly metallurgically bonded as an alloy with a low melting point metal.

2. The solid electrolytic capacitor of claim 1 wherein said first high melting point metal and said second melting point metal are the same.

3. The solid electrolytic capacitor of claim 1 wherein at least one of said first high melting point metal or said second melting point metal is selected from the group consisting of copper, silver, aluminum, gold, platinum, palladium, beryllium, rhodium, nickel, cobalt, iron and molybdenum or an alloy thereof.

4. The solid electrolytic capacitor of claim 3 wherein at least one of said first high melting point metal or said second melting point metal is selected from the group consisting of nickel, copper, gold, silver, tin, palladium and lead.

5. The solid electrolytic capacitor of claim 4 wherein said cathode is plated with metal.

6. The solid electrolytic capacitor of claim 1 wherein said low melting point metal is selected from the group consisting of tin, antimony, bismuth, cadmium, zinc, gallium, indium, tellurium, mercury, thallium, selenium and polonium or an alloy thereof.

7. The solid electrolytic capacitor of claim 6 wherein said low melting point metal is selected from the group consisting of tin, antimony and indium.

8. The solid electrolytic capacitor of claim 1 where said cathode comprises a conductive polymer.

9. The solid electrolytic capacitor of claim 8 wherein said conductive polymer is selected from the group consisting of polyaniline, polythiophene and polypyrrole.

10. The solid electrolytic capacitor of claim 9 wherein said conductive polymer is polyethylene dioxythiophene.

11. The solid electrolytic capacitor of claim 1 wherein said cathode further comprises a conductive coating further comprising a conductive particle.

12. The solid electrolytic capacitor of claim 11 wherein said conductive particle is selected from the group consisting of carbon black, graphite, graphene, carbon nanotubes, metal particles, carbon coated metal particles and metal coated carbon particles.

13. The solid electrolytic capacitor of claim 12 wherein said metal particles are selected from the group consisting of Ag, Cu, Ni, Sn, In, Bi, Sb, Au and Pd.

14. The solid electrolytic capacitor of claim 12 wherein said conductive particle comprise a metal coating selected from a high melting point metal and a low melting point metal.

15. The solid electrolytic capacitor of claim 1 wherein said adjacent layer is selected from a cathode lead, a mounting tab and an adjacent electrode.

16. The solid electrolytic capacitor of claim 15 wherein said cathode lead is a non-ferrous material or a ferrous material.

17. The solid electrolytic capacitor of claim 16 wherein said non-ferrous material is selected from copper, phosphor bronze, brass and beryllium copper.

18. The solid electrolytic capacitor of claim 1 wherein said low melting point metal is a single component.

19. A method for forming a capacitor comprising the steps of:
   providing an anode;
   forming a dielectric on said anode;
   applying a cathode on said dielectric;
   plating a first high melting point metal on said cathode;
   plating a second high melting point metal on a circuit trace, a cathode lead, a mounting tab or an adjacent cathode; and
   forming a direct metallurgical bond between said first high melting point metal and said second high melting point metal as an alloy with a low melting point metal.

20. The method for forming a capacitor of claim 19 wherein said first high melting point metal and said second high melting point metal are the same.

21. The method for forming a capacitor of claim 19 wherein said first high melting point metal or said second high melting point metal is selected from the group consisting of copper, silver, aluminum, gold, platinum, palladium, beryllium, rhodium, nickel, cobalt, iron and molybdenum or an alloy thereof.

22. The method for forming a capacitor of claim 21 wherein said first high melting point metal or said second high melting point metal is selected from the group consisting of nickel, copper, gold, silver, tin, palladium and lead.

23. The method for forming a capacitor of claim 19 wherein said low melting point metal is selected from the group consisting of tin, antimony, bismuth, cadmium, zinc, gallium, indium, tellurium, mercury, thallium, selenium and polonium or an alloy thereof.

24. The method for forming a capacitor of claim 23 wherein said low melting point metal is selected from the group consisting of tin, antimony and indium.

25. The method for forming a capacitor of claim 19 further comprising forming a coupon comprising said low melting point metal.

26. The method for forming a capacitor of claim 25 wherein said forming of said metallurgical bond between said high melting point metal and said adjacent layer comprises placing said coupon between said high melting point metal and said second high melting point metal.

27. The method for forming a capacitor of claim 19 wherein said cathode comprises a conductive polymer.

28. The method for forming a capacitor of claim 27 wherein said conductive polymer is selected from the group consisting of polyaniline, polythiophene and polypyrrole.

29. The method for forming a capacitor of claim 28 wherein said conductive polymer is polyethylene dioxythiophene.

30. The method for forming a capacitor of claim 19 wherein one of said first high melting point metal or said second high melting point metal is plated with said low melting point metal.

31. The method for forming a capacitor of claim 19 wherein said cathode lead is a metal or alloys with melting point above 300° C.

32. The method for forming a capacitor of claim 19 wherein said cathode lead is a non-ferrous material or a ferrous material.

33. The method for forming a capacitor of claim 32 wherein said non-ferrous material is selected from the group consisting of copper, phosphor bronze, brass and beryllium copper.

34. The method for forming a capacitor of claim 19 wherein said low melting point metal is a single component.

35. A capacitor stack comprising:
   at least two solid electrolytic capacitors with each solid electrolytic capacitor of said electrolytic capacitors comprising:
   an anode;
   a dielectric on said anode;
   a cathode on said dielectric; and
   a conductive coating plated on said cathode wherein said conductive coating comprises an exterior surface of a first high melting point metal; and
   an adjacent layer selected from a circuit trace and a lead wherein said adjacent layer comprises a second high melting point metal plated on said adjacent layer wherein said first high melting point metal and said second high melting point metal are metallurgically bonded as bridges of alloy with a low melting point metal there between.

36. The capacitor of claim 35 wherein at least one of said first high melting point metal or said second high melting point metal is selected from the group consisting of copper, silver, aluminum, gold, platinum, palladium, beryllium, rhodium, nickel, cobalt, iron and molybdenum or an alloy thereof.

37. The capacitor of claim 36 wherein at least one of said first high melting point metal or said second high melting point metal is selected from the group consisting of nickel, copper, gold, silver, tin, palladium and lead.

38. The capacitor of claim 35 wherein said low melting point metal is selected from the group consisting of tin, antimony, bismuth, cadmium, zinc, gallium, indium, tellurium, mercury, thallium, selenium and polonium or an alloy thereof.

39. The capacitor of claim 38 wherein said low melting point metal is selected from the group consisting of tin, antimony and indium.

40. The capacitor of claim 35 where said cathode comprises a conductive polymer.

41. The capacitor of claim 40 wherein said conductive polymer is selected from the group consisting of polyaniline, polythiophene and polypyrrole.

42. The capacitor of claim 41 wherein said conductive polymer is polyethylene dioxythiophene.

43. The capacitor of claim 35 wherein said adjacent layer is selected from a cathode lead a mounting tab and an adjacent cathode.

44. The capacitor of claim 43 wherein said cathode lead is a non-ferrous material or a ferrous material.

45. The capacitor of claim 44 wherein said non-ferrous material is selected from the group consisting of copper, phosphor bronze, brass and beryllium copper.

46. The capacitor of claim 35 wherein said low melting point metal is a single component.

\* \* \* \* \*